United States Patent [19]

Adell

[11] Patent Number: 4,489,519
[45] Date of Patent: Dec. 25, 1984

[54] EDGE GUARD

[75] Inventor: Robert Adell, Sunnyvale, Tex.

[73] Assignee: U.S. Product Development Company, Sunnyvale, Tex.

[21] Appl. No.: 533,688

[22] Filed: Sep. 19, 1983

[51] Int. Cl.³ .............................................. B60J 5/00
[52] U.S. Cl. ........................................ 49/462; 52/716
[58] Field of Search ............... 49/462, 491, 490, 440, 49/441; 52/716-718

[56] References Cited

U.S. PATENT DOCUMENTS

| 2,348,319 | 5/1944 | Bailey | 49/491 |
| 2,746,103 | 5/1956 | Bright | 49/491 |
| 2,954,310 | 9/1960 | Truesdell et al. | 52/716 X |
| 3,222,769 | 12/1965 | Le Plae | 52/716 X |
| 3,363,364 | 1/1968 | Cadiou | 52/716 X |
| 3,401,486 | 9/1968 | Adell | 49/462 |
| 3,706,173 | 12/1972 | Taylor | 49/462 X |
| 4,304,816 | 12/1981 | Bright et al. | 52/716 X |
| 4,311,747 | 1/1982 | Kruschwitz | 49/490 X |

FOREIGN PATENT DOCUMENTS 2542436 4/1976 Fed. Rep. of Germany ........ 49/491

Primary Examiner—Philip C. Kannan
Attorney, Agent, or Firm—Stephenson and Boller

[57] ABSTRACT

An edge guard of generally U-shaped cross section for fitting onto an edge comprises an insert having a cross section corresponding to the general U-shaped cross section of the edge guard and non-metallic material encapsulating said insert. The insert is an extrusion, either metal or plastic, and the non-metallic encapsulating material is a plastic, preferably a co-extrusion co-extruded onto the insert. The insert has a sculptured, or fluted, form throughout. Various sculptured forms are disclosed. The non-metallic encapsulating material may be colored as desired to impart a desired color to the edge guard.

13 Claims, 7 Drawing Figures

EDGE GUARD

BACKGROUND AND SUMMARY OF THE INVENTION

This invention relates to ornamental and protective edge guards such as are applied to the edges of sheet metal members of automotive vehicles, for example, swinging closures such as doors, trunk lids, hoods, gasoline fill doors, and other members such as drip rails, bumper edges, etc.

In an automotive vehicle, it is desirable to apply edge guards to the edge of a swinging closure so as to protect said edge from damage which might be caused by striking an object present in the path of movement of the edge of the swinging closure. Edge guards also provide ornamental and decorative function in addition to their door edge protective function, and they may also be applied to the edges of sheet metal members other than swinging closures.

In order to guard against corrosion, paint scratching, marring and other types of potential problems, the usage of insulated metallic edge guards has become prominent in the automobile industry. Reference is made to the following patents of applicant which relate to insulated metallic edge guards:

U.S. Pat. No. 4,259,812,
U.S. Pat. No. 4,316,348,
U.S. Pat. No. 4,334,700,
U.S. Pat. No. 4,338,148,
U.S. Pat. No. 4,365,450,
U.S. Pat. No. 4,377,056,
U.S. Pat. No. 4,379,376,
U.S. Pat. No. 4,379,377,
U.S. Pat. No. 4,387,125.

Applicant also has pending applications directed to the general subject of door edge guards including both insulated metallic edge guards and other types of edge guards.

One of the important advantages of an insulated metallic edge guard is that the edge guard may be self-retaining such that no separate fasteners, adhesives, or other means or procedures are required in order to install and retain an edge guard on a door edge.

Metallic insulated edge guards, while providing an insulating function between the metal of the edge guard and the metal of the painted door edge, may provide a decorative appearance by leaving the exterior of the metal edge guard channel free of insulation. For example, the exterior of a stainless steel edge guard presents a bright decorative metallic appearance. The exterior may, however, be selectively covered either partially or wholly to provide matching and/or contrasting color designs. Many of applicant's inventions are directed to this aspect of edge guards.

The present invention is directed to a further improvement in edge guards. In order to provide the best possible installation, appearance and functional characteristics, it is important for the cross sectional shape of the edge guard to be well controlled. Yet by the same token, the edge guard must be adaptable to variations in the door edge thickness which occur with present door manufacturing techniques.

One of the advantages of the present invention is that it comprises a door edge guard which possesses these characteristics and yet which can be fabricated with a reduced thickness of metal which forms an insert totally encapsulated by plastic in cross section. The invention is well adapted to manufacturing by extrusion techniques and is well-suited for the demands of the automotive manufacturing industry.

A further attribute of the invention is that the plastic insulation, in addition to providing the insulation function when the edge guard is mounted on the door edge, also may be colored as desired to provide a match and/or contrast with the painted door edge on which it is installed.

Although the present disclosure is of specific presently preferred embodiments, principles of the invention may be extended to other embodiments.

The foregoing features, advantages, and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

DESCRIPTION OF THE PREFERRED EMBODIMENT

Figure 1:
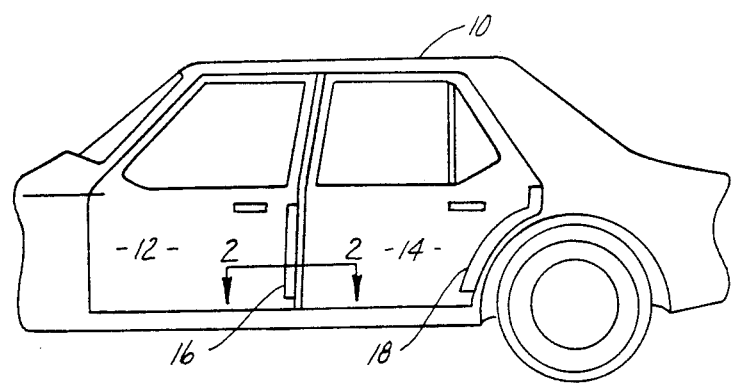
FIG. 1 is a partial side elevational view of an automobile equipped with door edge guards embodying principles of the present invention.

FIG. 1 shows a portion of an automobile 10 comprising front and rear doors 12 and 14 on the trailing edges of which are door edge guards 16 and 18 of the present invention.

The illustrated edge guards are elongate and essentially co-extensive in length with the trailing edges of the doors. Each edge guard conforms to the contour of the trailing edge of its door. It will be appreciated however that the actual length of an edge guard may be less than the length of the door trailing edge, and therefore, it will be appreciated that the drawing is merely representative.

Figure 2:
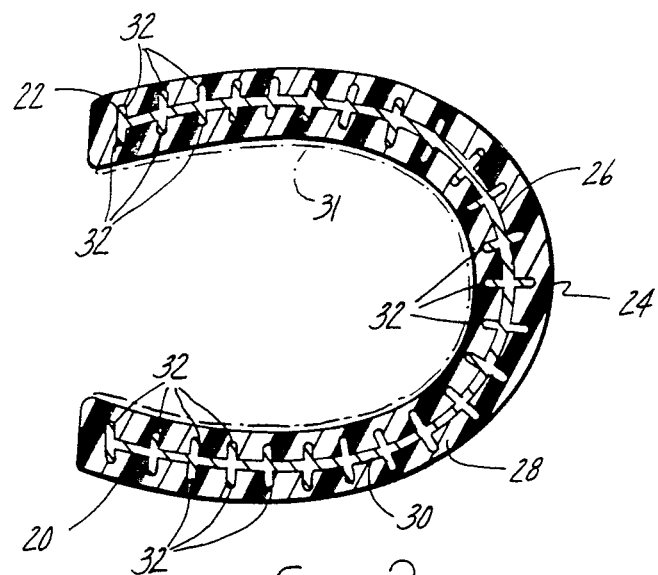
FIG. 2 is a transverse cross sectional view taken in the direction of arrows 2-2 in FIG. 1 through one of the edge guards, but showing the edge guard by itself on an enlarged scale.

FIG. 2 illustrates the transverse cross sectional shape of door edge guard 16. This cross sectional shape is representative throughout the length of the edge guard. The edge guard 16 is illustrated as having a general U-shape comprising legs 20 and 22 which extend away from a generally semi-circular base 24. The edge guard comprises a metallic insert member 26 which in cross section is fully encapsulated by suitable insulating material 28.

Insert member 26 has a sculptured shape comprising a central web 30 forming the general U-shape and a series of flanges 32 projecting away from opposite sides of the central main web 30 with said flanges being spaced apart along the extent of the U from the end of one leg to the other. The flanges 32 run lengthwise of the edge guard.

The insert member is preferably fabricated to the illustrated shape by an extrusion process and in this regard, any suitable material may be used, metal or plastic. An aluminum alloy is one suitable material and the insert so formed is a precision metal extrusion, known to the art as an alloyed aluminum extrusion. The insert is extruded by means of a suitable die corresponding to the cross sectional shape illustrated in FIG. 2.

The insulating material 28 may be applied to the metal insert through any suitable procedure. A co-extrusion process is a very satisfactory one, for it enables the material to be applied to the cross section of the insert in an efficient manner to insure that the insulation fills the spaces between the flanges 32 and forms to the desired cross sectional shape. Any suitable insulating material presently known to the art or developed in the future may be used. An example would be polyvinylchloride, or other plastic.

Because of the total encapsulation, the metallic insert if fully insulated from the painted door edge when the edge guard is installed thereon. Although it might be possible to render the edge guard self-retaining, the preferred procedure to secure the edge guard on the edge is by a separate attaching means and/or procedure. For example, a suitable adhesive could be applied to the interior of the U-shaped cross section to bond the interior of the U-shaped cross section of the door edge. The reference numeral 31 in FIG. 2 illustrates the application of a layer of adhesive to the interior of the U-shaped cross section. Any suitable adhesive material may be used which for example may be either air drying or a pressure sensitive, non-air drying type. Other procedures and means of attachment could also be employed including the application of chemicals and/or use of thermal procedures. Examples of thermal procedures include induction heating, ultrasonic heating, and laser bonding. These procedures deform the insulating material itself causing it to bond to the door edge. Depending upon the nature of the procedure used, intermediate bonding media may or may not be required.

The invention is such that the edge guard possesses a suitable form to retain the desired cross sectional shape, yet by selection of the relative dimensions and proportions it may be made readily conformable to the contour of a door edge. It will be appreciated that the illustration of the drawings is not necessarily intended to be a particular scale but rather is intended to be generally representative.

The illustrated shape of the insert provides a sufficient stiffening with a relatively thin wall. This is contrasted with other edge guards, such as self-retaining metallic edge guards in which the thickness of the metal is considerably greater. Hence, the present invention involves an efficient use of material, enabling edge guards to be fabricated entirely by extrusion procedures. This has the potential for affording improvements over other procedures where insulating material is laminated to metal sheets which are then subsequently slit to desired widths and roll-formed to desired cross sectional shapes.

The invention also enables color matching and/or contrast to be achieved as desired by merely changing the coloring which is used in the extruded plastic material. In other words, it is not necessary to stock different colored laminated sheets as might be required when different color edge guards are made from laminated stock subsequently slit and roll-formed.

Figure 3:
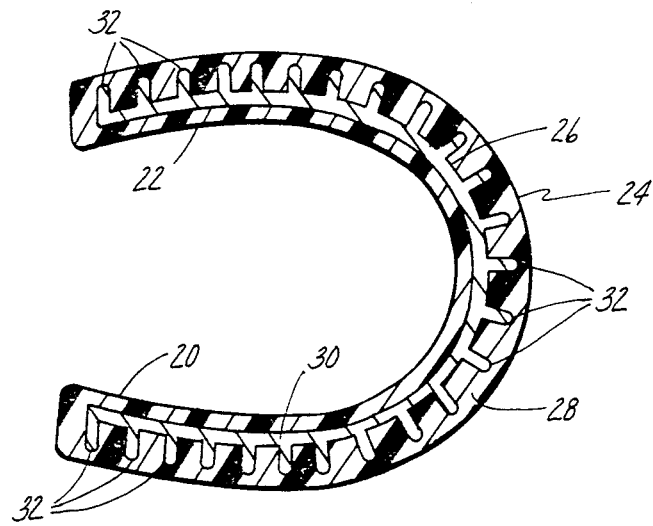
FIG. 3 is a transverse cross sectional view similar to FIG. 2 illustrating another embodiment of edge guard.

FIG. 3 illustrates a second embodiment of the invention. This embodiment is similaer to the embodiment of FIG. 2 except that in FIG. 3 the flanges 32 extend only outwardly from the central main web 30, and the central main web is disposed more toward the interior of the U. This embodiment possesses the same advantages and attributes as the FIG. 2 embodiment.

Figure 4:
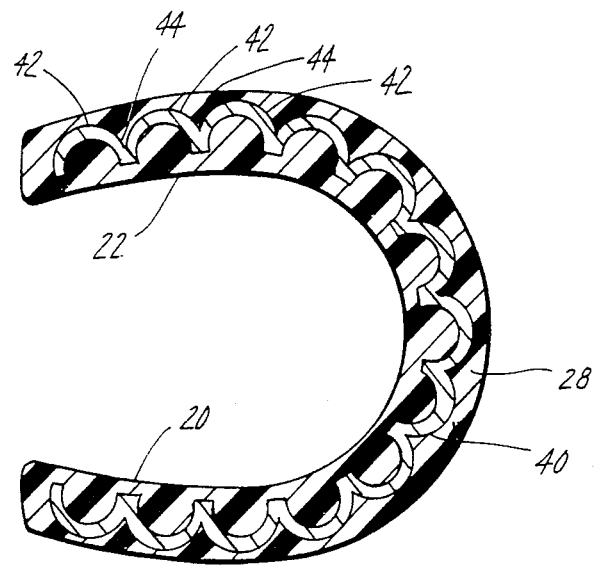
FIG. 4 is a transverse cross sectional view similar to FIG. 2 illustrating a third embodiment.

FIG. 4 illustrates a third embodiment which is somewhat different from the embodiments of FIGS. 2 and 3. The embodiment of FIG. 4 comprises a differently shaped insert which is identified by reference numeral 40. Like the previous inserts, it is a sculptured extrusion which is extruded to the illustrated shape through a precision metal extrusion process known to the art as alloyed aluminum extrusion. The insert 40 has a general overall U-shape conforming to the shape of the edge guard but is comprised of a series of generally semi-circular segments individually identified by the reference numerals 42. These individual segments 42 integrally join along lines of tangency 44 around the U-shaped cross section. The illustrated construction has the concave surfaces of the semi-circular segments 42 facing toward the interior of the U-shaped cross section.

Figure 5:
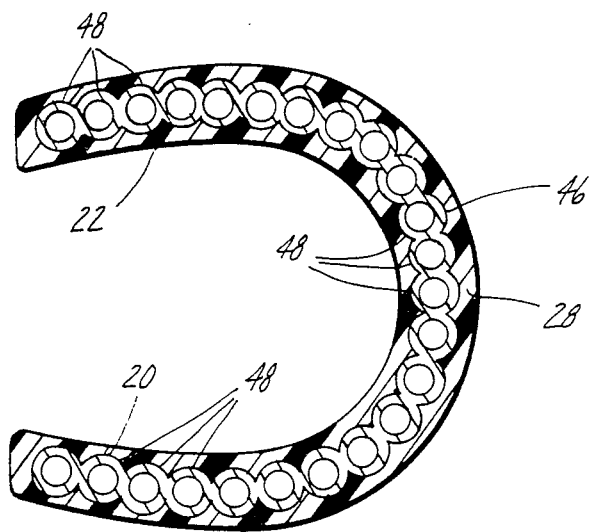
FIG. 5 is a transverse cross sectional view similar to FIG. 2 illustrating a fourth embodiment.

FIG. 5 depicts another embodiment which like the preceding three embodiments possesses a sculptured appearance for the insert. In the FIG. 5 embodiment, the insert 46 comprises a succession of circular tubes 48 which integrally tangentially join, extending around the U to form the illustrated U-shape cross section. The tubes 48 are illustrated as being hollow and of generally thin walled construction.

Figure 6:
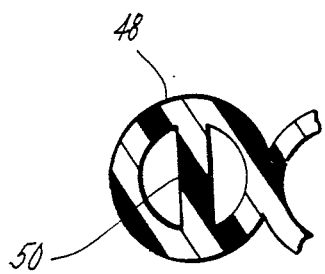
FIG. 6 is an enlarged fragmentary view illustrating a modification to the edge guard of FIG. 5.
Figure 7:
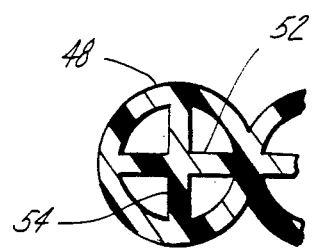
FIG. 7 is an enlarged fragmentary view illustrating another modification to the edge guard of FIG. 5.

It is possible to incorporate ribs into the cross sections of the tubes 48, selectively as desired, to impart different strength characteristics to the individual tubes. FIG. 6 illustrates one possible construction in which a diametrically extending rib 50 is provided across one of the tubes 48. FIG. 7 illustrates still another construction in which two intersecting ribs 52 and 54 extend diametrically across a tube 48 at 90° to each other. In all instances the ribs are a part of the extrusion. FIGS. 6 and 7 show plastic as the insert material.

In all embodiments, the insert extrusions are preferably applied to the door edge through one of the means and/or procedures such as those referred to above. All embodiments possess the attribute of desired color matching and/or color contrasts through the coloring of the encapsulating plastic. Although the precision metal extrusion known to the art as alloyed aluminum extrusion is preferred, the sculptured, or fluted, appearance may be imparted through other procedures and with other materials presently known or to be formulated to desired manufacturing techniques. With the invention, the advantages referred to above are achieved, in particular a stiffening of the edge guard with a lesser thickness of insert material. Although the invention is not to be limited by specific dimensions, thicknesses from 0.004 to 0.020 inches are typical.

While a preferred embodiment of the invention has been disclosed, it will be appreciated that principles of the invention are applicable to other embodiments.

What is claimed is:

1. An edge guard of general U-shaped cross section for fitting onto an edge, said edge guard comprising an insert having a general U-shaped cross section corresponding to the U-shaped cross section of the edge guard and non-metallic material encapsulating said insert, said insert having a regular sculptured form throughout the extent of the U so as to provide stiffening to the edge guard and with the non-metallic material interlocking with the sculpturing of the insert and in which said sculptured insert comprises a main U-shaped web corresponding to the general U-shape of the cross section and said web comprising means defining longitudinal fluting providing said sculptured form, said means defining longitudinal fluting, when viewed in transverse cross section, being open toward the interior of the U and extending interiorly from said web.

2. An edge guard as set forth in claim 1 in which said sculptured insert is an extrusion.

3. An edge guard as set forth in claim 1 including adhesive on the interior of the U-shaped cross section for bonding of the edge guard to the edge.

4. An edge guard as set forth in claim 1 in which said insert is plastic.

5. An edge guard as set forth in claim 1 in which said insert is metal.

6. An edge guard as set forth in claim 1 in which said non-metallic material, when the edge guard is viewed in cross section, fully covers both interior and exterior of the U of the insert.

7. An edge guard of general U-shaped cross section for fitting onto an edge, said edge guard comprising an insert having a general U-shaped cross section corresponding to the U-shaped cross section of the edge guard and non-metallic material encapsulating said insert, said insert having a regular sculptured form throughout the extent of the U so as to provide stiffening to the edge guard and with the non-metallic material interlocking with the sculpturing of the insert, and in which said sculptured insert comprises a main U-shaped web corresponding to the general U-shape of the cross section and flanges projecting from said web, and in which said flanges project in a regular pattern from both sides of said web.

8. An edge guard of general U-shaped cross section for fitting onto an edge, said edge guard comprising an insert having a general U-shaped cross section corresponding to the U-shaped cross section of the edge guard and non-metallic material encapsulating said insert, said insert having a regular sculptured form throughout the extent of the U so as to provide stiffening to the edge guard and with the non-metallic material interlocking with the sculpturing of the insert, and in which said sculptured insert comprises a main U-shaped web corresponding to the general U-shape of the cross section and flanges projecting from said web, and in which said flanges project in a regular pattern from only one side of said web, and said flanges project outwardly of the U-shaped web.

9. An edge guard of general U-shaped cross section for fitting onto an edge, said edge guard comprising an insert having a general U-shaped cross section corresponding to the U-shaped cross section of the edge guard and non-metallic material encapsulating said insert, said insert having a regular sculptured form throughout the extent of the U so as to provide stiffening to the edge guard and with the non-metallic material interlocking with the sculpturing of the insert and in which said sculptured insert comprises a succession of rounded segments which tangentially join along the extent of the U.

10. An edge guard as set forth in claim 9 in which said rounded segments are of semi-circular shape.

11. An edge guard as set forth in claim 9 in which said segments are of circular shape.

12. An edge guard as set forth in claim 11 in which said segments are hollow.

13. An edge guard as set forth in claim 11 in which said segments include internal reinforcing ribs.

* * * * *